United States Patent [19]
Ro

[11] Patent Number: 6,034,941
[45] Date of Patent: Mar. 7, 2000

[54] VIBRATION-ABSORBING DAMPER FOR OPTICAL DISK DRIVE

[75] Inventor: Dae-sung Ro, Anyang, Rep. of Korea

[73] Assignee: Samsung Electronics Co., Ltd., Kyungki-do, Rep. of Korea

[21] Appl. No.: 08/822,691

[22] Filed: Mar. 24, 1997

[30]     Foreign Application Priority Data

Jul. 16, 1996 [KR]   Rep. of Korea ........................ 96-28879

[51] Int. Cl.⁷ ................................................. G11B 23/00
[52] U.S. Cl. .............................................................. 369/263
[58] Field of Search ...................................... 369/263, 247, 369/44.15; 360/97.02, 137; 49/9; 248/562, 610, 585

[56]                    References Cited

U.S. PATENT DOCUMENTS

| 4,442,367 | 4/1984 | Suzuki | 310/91 |
|---|---|---|---|
| 5,323,885 | 6/1994 | Fukunaga et al. | 188/381 |
| 5,668,791 | 9/1997 | Yamada et al. | 369/247 |
| 5,703,734 | 12/1997 | Berberich et al. | 360/97.02 |
| 5,721,457 | 2/1998 | Sri-Jayantha et al. | 307/119 |
| 5,768,249 | 6/1998 | Ro et al. | 369/263 |

FOREIGN PATENT DOCUMENTS

| 2-249192 | 10/1990 | Japan . |  |
|---|---|---|---|
| 6-236669 | 8/1994 | Japan | 369/263 |
| 8-55468 | 2/1996 | Japan . |  |

*Primary Examiner*—Stuart S. Levy
*Assistant Examiner*—Tod Kupstas
*Attorney, Agent, or Firm*—Sughrue, Mion, Zinn, Macpeak & Seas, PLLC

[57]                    ABSTRACT

A vibration-absorbing damper for an optical disk drive for absorbing external vibrations, installed between a deck plate and a deck frame, which includes upper and lower vertical vibration-absorbing portions, positioned in parallel to each other at a predetermined distance for absorbing vibrations applied thereto in a vertical direction; a horizontal vibration-absorbing portion vertically extending from the upper vertical vibration-absorbing portion to the lower vertical vibration-absorbing portion for absorbing vibrations applied thereto in a horizontal direction; a partition vertically combining the upper and lower vibration-absorbing portions; and a protrusion protruded from the lower surface of the lower vertical vibration-absorbing portion and having a hooking portion to be combined with the deck frame.

6 Claims, 3 Drawing Sheets

VIBRATION-ABSORBING DAMPER FOR OPTICAL DISK DRIVE

BACKGROUND OF THE INVENTION

The present invention relates to a vibration-absorbing damper used for an optical disk drive which is capable of absorbing vertical and horizontal vibrations.

Generally, an optical disk drive for recording or reading information on/from a disk, an optical recording medium, includes an optical pickup for emitting a laser beam to a predetermined position of the disk and for picking up the light reflected therefrom, a motor driving unit for rotating the disk and for moving the optical pickup, and a signal processing unit for processing the picked-up signal.

The optical disk drive constructed as described above rotates the disk by means of a driving motor and processes the data recorded on the disk as the optical pickup follows the tracks of the rotating disk. Thus, to correctly reproduce data, which is recorded on the disk with high density, the optical pickup is controlled by a tracking servo and a focus servo such that the beam of the optical pickup can be focused accurately onto the tracks of the disk.

However, when uncontrollable external impacts or vibrations are applied to a deck plate on which the optical pickup and the motor driving unit are installed, errors are generated during processing of the data of the optical disk drive.

Accordingly, a vibration-absorbing damper capable of absorbing vibrations and impacts and thus enabling stable data processing is required, which is to be installed between the deck plate, on which the optical pickup and the motor driving unit are installed, and a deck frame combined with the deck plate.

FIG. 1 shows an optical disk drive employing a conventional vibration-absorbing damper. As shown in the drawing, the optical disk drive is provided with a deck frame 5, which is part of a body. A deck plate 4, on which a turntable 7 having a disk (not shown) seated thereon and an optical pickup 6 for reading information from the disk are installed, is provided on the deck frame 5. Also, a plurality of dampers 3 for reducing vibrations transmitted from the deck frame 5 to the deck plate 4 are installed each being coupled by a screw 1 between the deck plate 4 and the deck frame 5.

Referring to FIG. 2, which illustrates the structure of the damper 3 in detail, the conventional damper 3 has an 8-shaped body in which cavities 3a having a circular planar section are formed, to absorb the external vibrations.

In the damper 3 having such a structure, when impacts or vibrations are transmitted from the outside to the deck frame 5, the damper 3 is elastically biased in a vertical direction within an elastically deformable range of the cavities 3a according to the external vibrations. Thus, the external vibrations can be absorbed by the cavities 3a as passing the damper 3. As a result, the external vibrations are hardly transmitted to the spindle motor for rotating the disk and the optical pickup 6. Thus, reproduction errors in the optical disk drive can be prevented.

However, since the above-described conventional damper 3 must be combined accurately using the screw 1, assembly of the optical disk drive becomes difficult. That is, if the screw 1 is not correctly coupled vertically or is overly screwed, the cavities 3a of the damper 3 cannot be elastically deformed sufficiently and thus the efficiency of absorbing vibrations is lowered. Also, if one of the screws is coupled loosely, the horizontal balance of the deck plate 4 cannot be maintained, which affects the deck plate 4 and other neighboring parts, such that performance of the optical disk drive is deteriorated. Furthermore, the conventional damper 3 sufficiently exhibits a vibration-absorbing characteristic in a vertical direction, but not in a horizonal direction due to its construction. Thus, it is to be installed only in the horizontal direction. In addition, hardness of material of each of the dampers 3 should be differentiated in accordance with the position of the center of gravity of the deck plate 4.

SUMMARY OF THE INVENTION

With a view to substantially eliminate the above-noted problems, an object of the present invention is to provide a vibration-absorbing damper capable of effectively absorbing vibrations or impacts applied not only in a vertical direction but also in a horizontal direction, and which has a simplified combination structure.

To achieve the above object, there is provided a vibration-absorbing damper for an optical disk drive for absorbing external vibrations, installed between a deck plate on which a turntable and an optical pickup are installed and a deck frame connected to a body of the optical disk drive, the vibration-absorbing damper comprising: upper and lower vertical vibration-absorbing portions, positioned in parallel to each other at a predetermined distance and each having a cavity for absorbing vibrations applied thereto in a vertical direction; a horizontal vibration-absorbing portion vertically extending from the upper vertical vibration-absorbing portion to the lower vertical vibration-absorbing portion and having a cavity for absorbing vibrations applied thereto in a horizontal direction; a partition vertically combining the upper and lower vibration-absorbing portions with each other to support the same; and a protrusion protruded from the lower surface of the lower vertical vibration-absorbing portion and having a hooking portion to be combined with the deck frame, in which, to combine the vibration-absorbing damper with the deck plate. The partition is inserted into a groove formed in the deck plate so that the lower surface of the upper vertical vibration-absorbing portion and the upper surface of the lower vertical vibration-absorbing portion closely contact the upper and lower surfaces of the deck plate, respectively, and the protrusion of the lower vertical vibration-absorbing portion is inserted into a hole formed in the deck frame.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
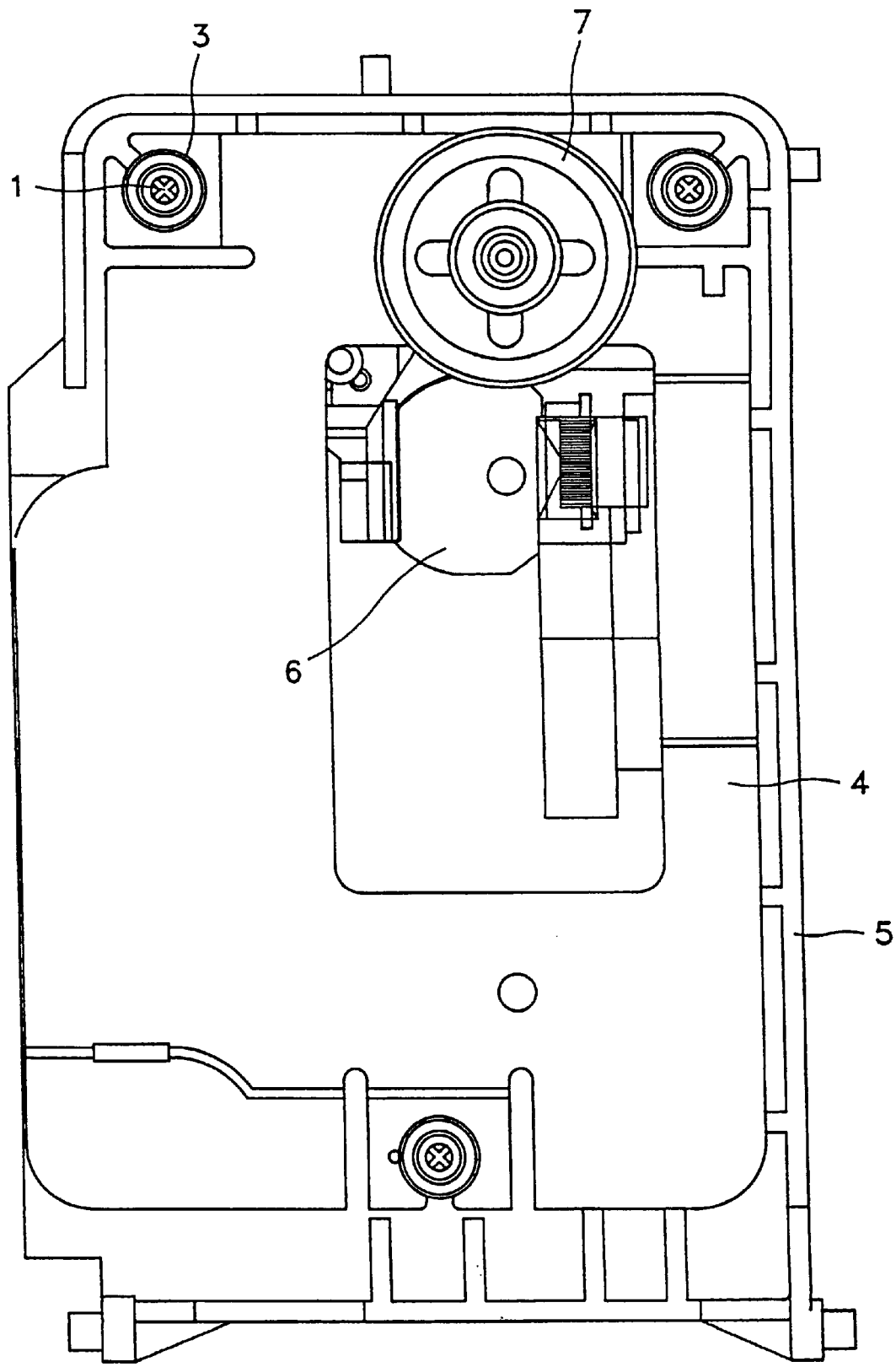
FIG. 1 is a plan view schematically showing a structure of a conventional optical disk drive.
Figure 2:
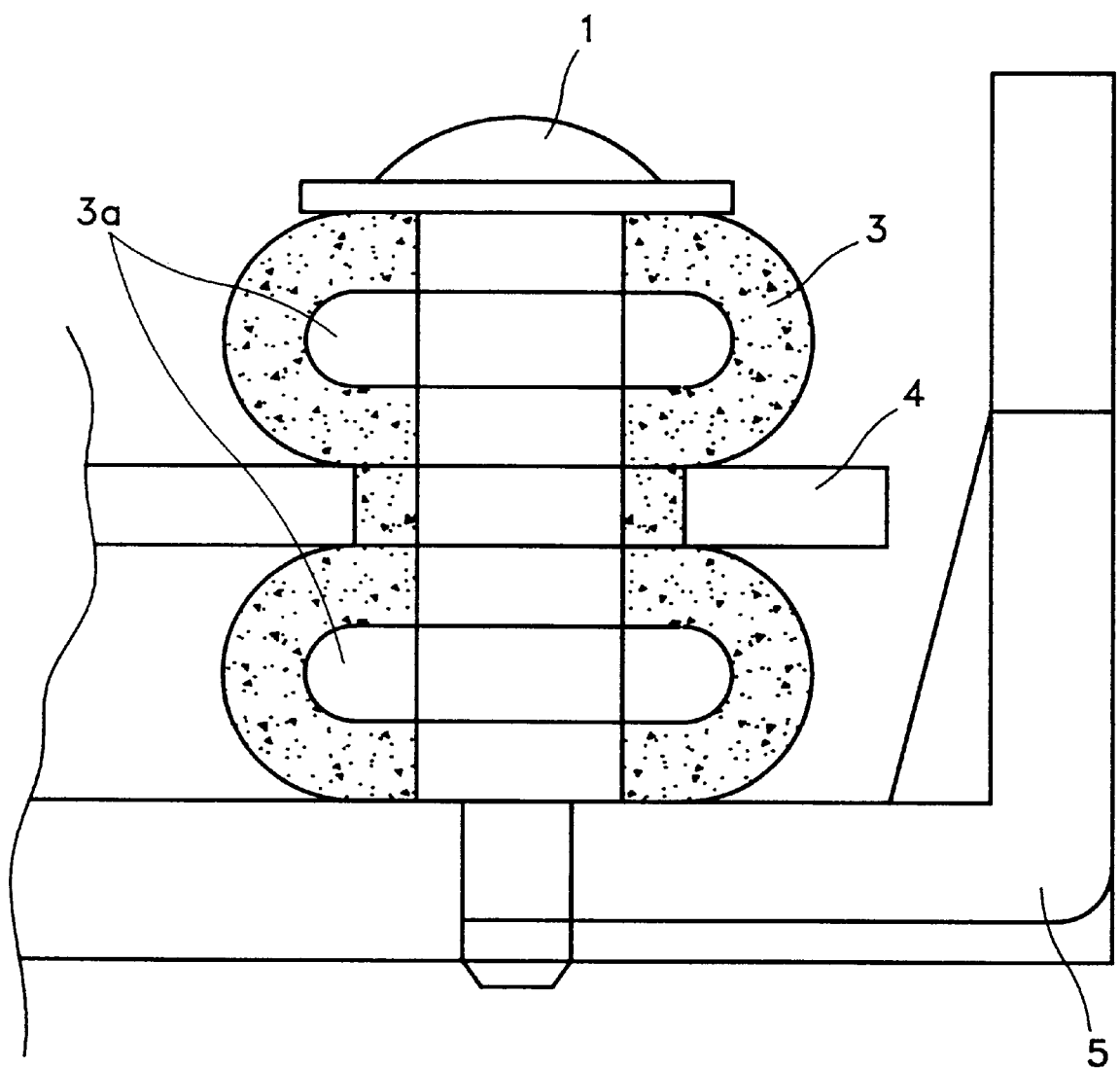
FIG. 2 is an enlarged vertical sectional view showing a conventional vibration-absorbing damper employed by the optical disk drive of FIG. 1.
Figure 3:
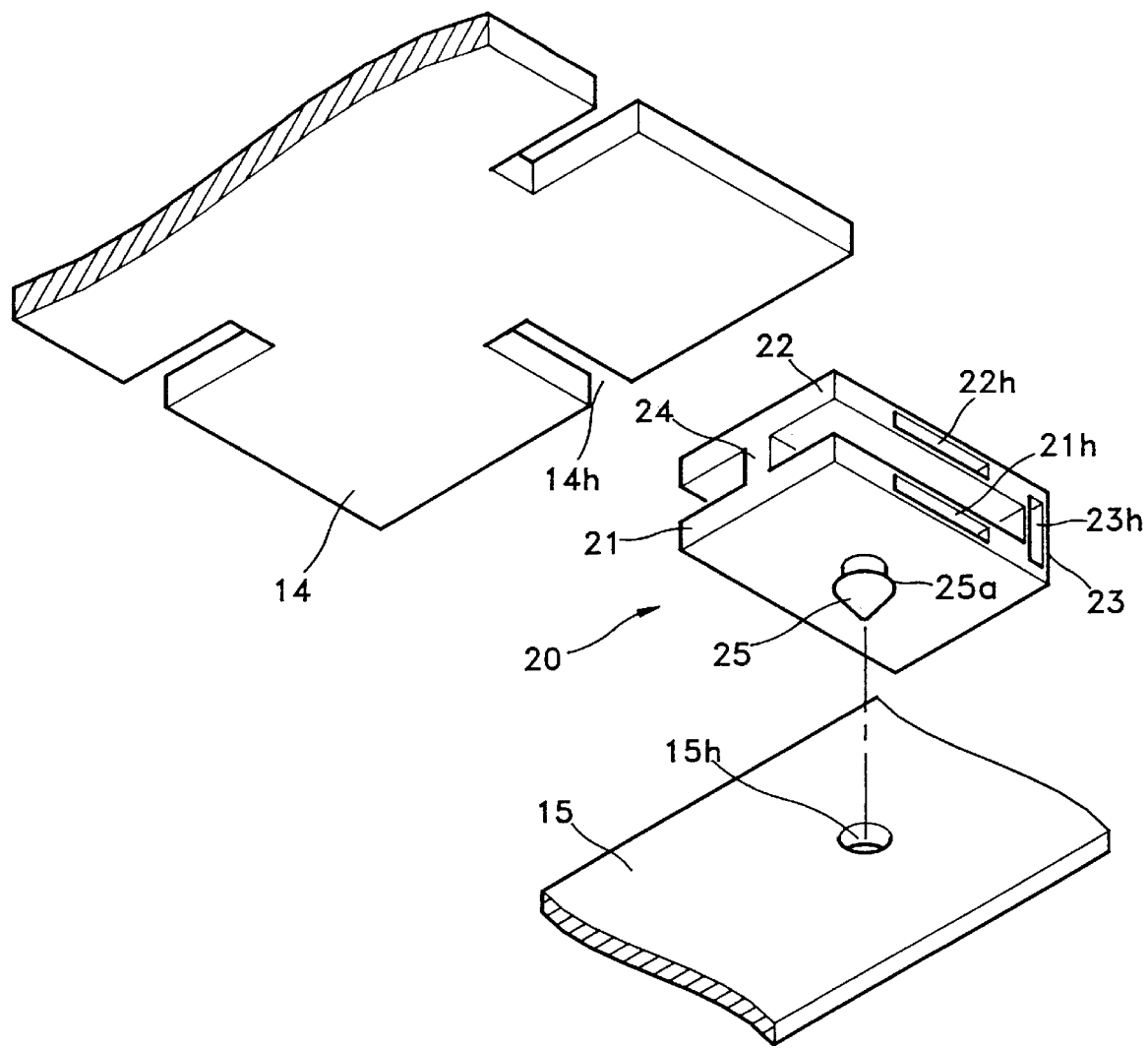
FIG. 3 is a perspective view showing a vibration-absorbing damper according to an embodiment of the present invention.
Figure 4:
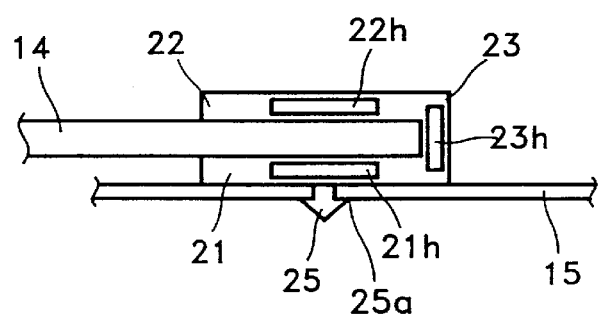
FIG. 4 is a sectional view showing the assembled state of the vibration-absorbing damper illustrated in FIG. 3.

Referring to FIGS. 3 and 4, a vibration-absorbing damper 20 according to an embodiment of the present invention includes upper and lower vertical vibration-absorbing portions 22 and 21 for absorbing vibrations in a vertical direction, a horizontal vibration-absorbing portion 23 for absorbing vibrations in a horizontal direction, a partition 24 for connecting and supporting the upper and lower vertical vibration-absorbing portions 22 and 21, which is inserted into a groove 14h of a deck plate 14, and a combining protrusion 25 which is combined with a hole 15h in a deck frame 15.

The above-described vibration-absorbing damper 20 can absorb vibrations in both the vertical and horizontal directions and can be coupled with the deck plate 14 and the deck frame 15 without using additional combining members. That is, the partition 24 is inserted into the groove 14h of the deck plate 14 to combine the vibration-absorbing damper 20 with the deck plate 14 such that the lower surface of the upper vertical vibration-absorbing portion 22 and the upper surface of the lower vertical vibration-absorbing portion 21 contact closely the upper and lower surfaces of the deck plate 14, respectively. Also, the combining protrusion 25 formed on the lower surface of the lower vertical vibration-absorbing portion 21 is coupled with the hole 15h formed in the deck frame 15. It is preferable that the vibration-absorbing damper 20 according to an embodiment of the present invention is made of an elastic material, such as rubber, which is advantageous in absorbing vibrations, cheap and capable of being manufactured in a body. Thus, the combining protrusion 25 is elastically deformed, as passing through the hole 15h, and restored to its original form and then a hooking portion 25a is hooked by the deck frame 15. Thus, the vibration-absorbing damper 20 can be simply combined with the deck frame 15 without a additional combining member such as a screw.

The vibration-absorbing damper 20 having such a structure absorbs vibrations applied to the deck plate 14 in a vertical direction by the upper and lower vibration-absorbing portions 22 and 21. In detail, the vertical and horizontal vibrations are absorbed primarily by the elastic material constituting the upper and lower vibration-absorbing portions 22 and 21 and the horizontal vibration-absorbing portion 23, and then, more effectively by cavities 21h, 22h and 23h formed inside of the respective vibration-absorbing portions 21, 22 and 23.

It is preferable to properly regulate the hardness of the material constituting the vibration-absorbing damper 20 according to the weight of each of the optical pickup (not shown) or a spindle motor (not shown) installed on the deck plate 14.

Preferably, in order to combine the vibration-absorbing damper 20 with the deck plate 14 and effectively absorb the vibrations or impacts applied to the deck frame 15 from the outside, the contact surface of the vibration-absorbing surface which contacts the deck plate 14 adheres to the entire contact surface uniformly. Moreover, it is preferable that the combining protrusion 25 inserted into the hole 15h of the deck frame 15 is formed to be consistent with the center of the partition 24.

As described above, the vibration-absorbing damper of an optical disk drive according to the present invention can be coupled with both the deck plate and the deck frame without additional coupling members owing to its structure, and can effectively absorb vibrations or impacts applied not only in a vertical direction but also in a horizontal direction by the elastic material forming the damper and the cavities formed therein.

While a specific example of the invention has been described herein, it is to be understood that various modifications may be apparent to one skilled in the art without departing from the spirit and scope of the invention.

What is claimed is:

1. A vibration-absorbing damper for absorbing external vibrations of an optical disk drive, installed at least partially between a deck plate, on which a turntable and an optical pickup are installed, and a deck frame connected to a body of said optical disk drive, said vibration-absorbing damper comprising:

upper and lower vertical vibration-absorbing portions, positioned in parallel to each other at a predetermined distance, each of said upper and lower vertical vibration-absorbing portions having a cavity for absorbing vibrations applied thereto in a vertical direction;

a horizontal vibration-absorbing portion vertically extending from said upper vertical vibration-absorbing portion to said lower vertical vibration-absorbing portion and having a cavity for absorbing vibrations applied thereto in a horizontal direction;

a partition vertically combining and supporting said upper and lower vibration-absorbing portions; and a protrusion protruding from a lower surface of said lower vertical vibration-absorbing portion and having a hooking portion to be combined with said deck frame;

said deck plate comprising a groove for receiving said partition so that a lower surface of said upper vertical vibration-absorbing portion and an upper surface of said lower vertical vibration-absorbing portion closely contact upper and lower surfaces of said deck plate, respectively; and wherein said deck frame comprises a hole for receiving said protrusion of said lower vertical vibration-absorbing portion.

2. The vibration-absorbing damper according to claim 1, wherein said upper and lower vertical vibration absorbing portions and said horizontal vibration-absorbing portion are made of elastic material and manufactured as a single unit.

3. A vibration-absorbing damper for absorbing external vibrations of an optical disk drive, installed at least partially between a deck plate, on which a turntable and an optical pickup are installed, and a deck frame connected to a body of said optical disk drive, said vibration-absorbing damper comprising:

upper and lower vertical vibration-absorbing portions, positioned in parallel to each other at a predetermined distance;

a horizontal vibration-absorbino portion vertically extending from said upper vertical vibration-absorbing portion to said lower vertical vibration-absorbing portion for absorbing vibrations applied thereto in a horizontal direction;

a partition vertically combining and supporting said upper and lower vibration-absorbing portions; and a protrusion protruding from a lower surface of said lower vertical vibration-absorbing portion and having a hooking portion to be combined with said deck frame;

wherein each of said upper and lower vertical vibration-absorbing portions comprises a cavity for absorbing vibrations applied thereto in a vertical direction.

4. The vibration-absorbing damper according to claim 3, wherein said horizontal vibration-absorbing portion comprises a cavity for absorbing vibrations applied thereto in a horizontal direction.

5. The vibration-absorbing damper according to claim 4, wherein said deck plate comprises a groove for receiving said partition so that a lower surface of said upper vertical vibration-absorbing portion and an upper surface of said lower vertical vibration-absorbing portion closely contact upper and lower surfaces of said deck plate, respectively; and wherein said deck frame comprises a hole for receiving said protrusion of said lower vertical vibration-absorbing portion.

6. A vibration-absorbing damper for absorbing external vibrations of an optical disk drive, installed at least partially between a deck plate, on which a turntable and an optical pickup are installed, and a deck frame connected to a body of said optical disk drive, said vibration-absorbing damper comprising:

upper and lower vertical vibration-absorbing portions, positioned in parallel to each other at a predetermined distance;

a horizontal vibration-absorbing portion vertically extending from said upper vertical vibration-absorbing portion to said lower vertical vibration-absorbing portion for absorbing vibrations applied thereto in a horizontal direction;

a partition vertically combining and supporting said upper and lower vibration-absorbing portions; and a protrusion protruding from a lower surface of said lower vertical vibration-absorbing portion and having a hooking portion to be combined with said deck frame;

wherein said deck plate comprises a groove for receiving said partition so that a lower surface of said upper vertical vibration-absorbing portion and an upper surface of said lower vertical vibration-absorbing portion closely contact upper and lower surfaces of said deck plate, respectively;

wherein said deck frame comprises a hole for receiving said protrusion of said lower vertical vibration-absorbing portion; and wherein said vibration-absorbing damper is secured to said deck plate and to said deck frame only by said partition and protrusion, respectively.

* * * * *